US010667311B2

(12) United States Patent
Nguyen et al.

(10) Patent No.: US 10,667,311 B2
(45) Date of Patent: May 26, 2020

(54) SYSTEM AND METHOD FOR DATA COMMUNICATION

(71) Applicant: NEC CORPORATION, Tokyo (JP)

(72) Inventors: Phong Nguyen, Mulgrave (AU); Kevin Lin, Mulgrave (AU)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 16/388,289

(22) Filed: Apr. 18, 2019

(65) Prior Publication Data

US 2019/0254093 A1 Aug. 15, 2019

Related U.S. Application Data

(63) Continuation of application No. 15/551,167, filed as application No. PCT/JP2016/000724 on Feb. 12, 2016, now Pat. No. 10,314,094.

(30) Foreign Application Priority Data

Feb. 26, 2015 (AU) ................................ 2015900674

(51) Int. Cl.
*H04W 76/14* (2018.01)
*H04W 72/04* (2009.01)
(Continued)

(52) U.S. Cl.
CPC ........... *H04W 76/14* (2018.02); *H04W 16/26* (2013.01); *H04W 24/02* (2013.01); *H04W 48/10* (2013.01);
(Continued)

(58) Field of Classification Search
CPC . H04W 76/14; H04W 72/1273; H04W 48/10; H04W 24/02; H04W 16/26; H04W 72/0446; H04W 88/04
See application file for complete search history.

(56) References Cited

U.S. PATENT DOCUMENTS

2011/0255450 A1 10/2011 Wang et al.
2011/0310821 A1* 12/2011 Kim .................... H04B 7/15542
370/329
(Continued)

FOREIGN PATENT DOCUMENTS

JP 2013-530570 A 7/2013
JP 2015-19178 A 1/2015
(Continued)

OTHER PUBLICATIONS

"Status Report to TSG", 3GPP TSG RAN meeting #66, RP-141894, Maui, USA, Dec. 8-11, 2014, pp. 1/3-38/3.
(Continued)

*Primary Examiner* — Thai Nguyen
(74) *Attorney, Agent, or Firm* — Sughrue Mion, PLLC

(57) ABSTRACT

A system and method of data communication is provided for use in a wireless communication system. The wireless communication system includes a base station, a relay user equipment (UE) and an out of coverage UE (OOC-UE). The method includes receiving, at the relay UE and from the base station, a relay cycle configuration, the relay cycle configuration defining a relay cycle including a first time period for device to device (D2D) communication, and a second time period for cellular communication. The method then includes receiving, at the relay UE by D2D communication, within the first time period and from the out of coverage UE (OOC-UE), relay data, and providing, from the relay UE by cellular communication, within the second time period and to the BS, the relay data.

2 Claims, 12 Drawing Sheets

(51) Int. Cl.
*H04W 16/26* (2009.01)
*H04W 24/02* (2009.01)
*H04W 48/10* (2009.01)
*H04W 72/12* (2009.01)
*H04W 88/04* (2009.01)

(52) U.S. Cl.
CPC ... *H04W 72/0446* (2013.01); *H04W 72/1273* (2013.01); *H04W 88/04* (2013.01)

(56) References Cited

U.S. PATENT DOCUMENTS

| | | |
|---|---|---|
| 2013/0170414 A1 | 7/2013 | Kwon |
| 2016/0081073 A1 | 3/2016 | Lindoff et al. |
| 2016/0227518 A1* | 8/2016 | Li ..................... H04W 72/042 |
| 2017/0245233 A1* | 8/2017 | Jung .................... H04W 56/00 |
| 2017/0347338 A1 | 11/2017 | Chen et al. |

FOREIGN PATENT DOCUMENTS

| | | |
|---|---|---|
| WO | 2014/112802 A1 | 7/2014 |
| WO | 2015/026111 A1 | 2/2015 |

OTHER PUBLICATIONS

"UE-Relay for Device to Device Proximity Services", Institute for Information Industry (III), 3GPP TSG-RAN WG1 Meeting #74, R1-133188, Barcelona, Spain, Aug. 19-23, 2013, 2-pages.

International Search Report for PCT/JP2016/000724 dated May 31, 2016 [PCT/ISA/210].

"Design considerations and performance evaluation for D2D broadcast/relay", 3GPP TSG RAN WG1 Meeting #74bis, R1-134229, Guangzhou, China, Oct. 7-11, 2013, pp. 1-7.

"Multiplexing of Uu and D2D communication", LG Electronics, 3GPP TSG RAN WG1 Meeting #76, R1-140335, Prague, Czech Republic, Feb. 10-14, 2014, pp. 1-7.

Written Opinion for PCT/JP2016/000724 dated May 31, 2016 [PCT/ISA/237].

Communication dated May 20, 2019, from the European Patent Office in counterpart application No. 16707240.4.

Communication dated Oct. 1, 2019, from the Japanese Patent Office in counterpart application No. 2017-544981.

NEC, "Coordination of WAN and D2D communications for efficient UE-to-Network Relay", 3GPP TSG RAN WG1 Meeting #81, R1-152679, Fukuoka, Japan, May 25-29, 2015 (4 pages total).

* cited by examiner

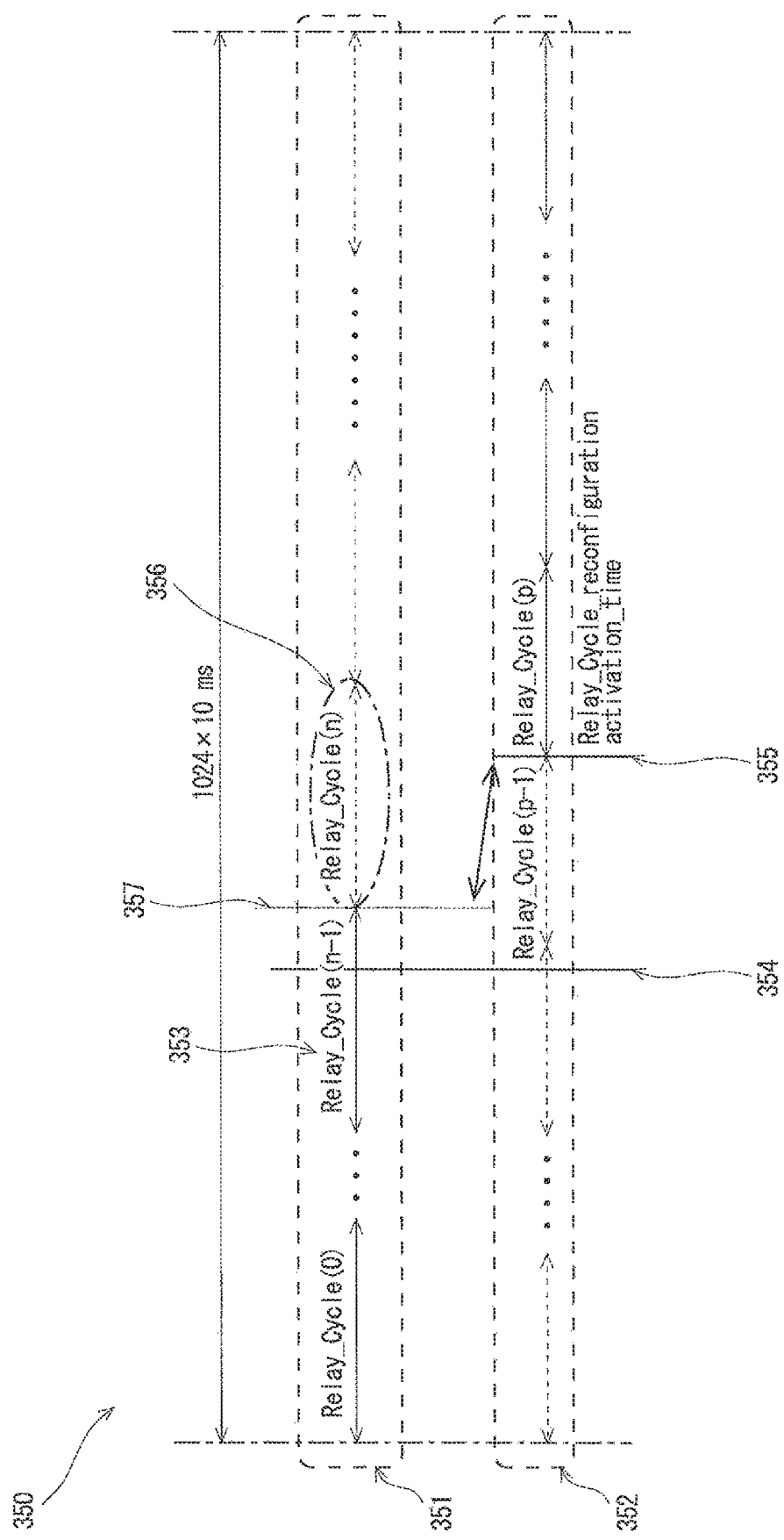

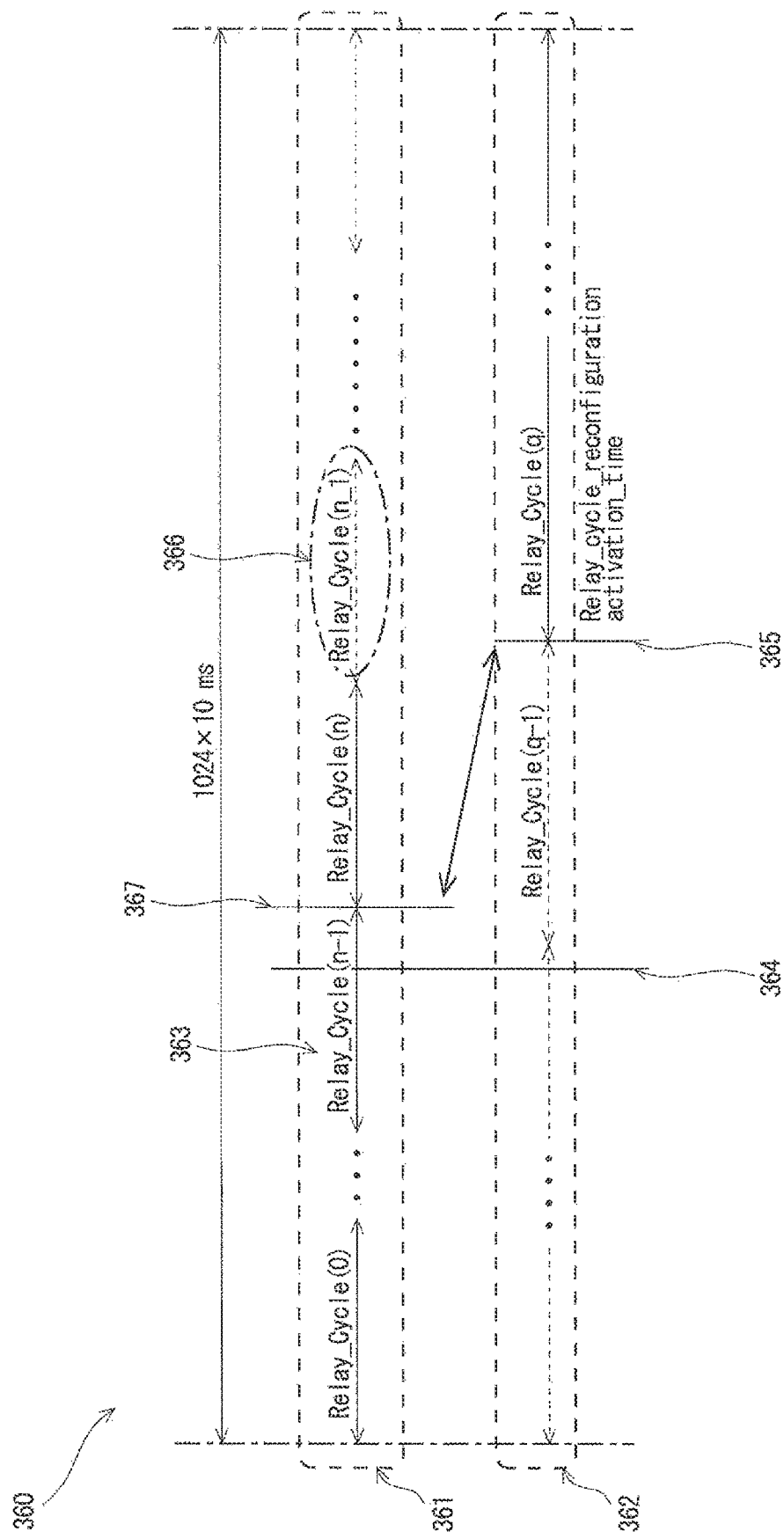

SYSTEM AND METHOD FOR DATA COMMUNICATION

CROSS REFERENCE TO RELATED APPLICATIONS

This application is a continuation of U.S. application Ser. No. 15/551,167 filed on Aug. 15, 2017, which is a National Stage of International Application No. PCT/JP2016/000724, filed on Feb. 12, 2016, which claims priority from Australian Patent Application No. 2015900674, filed on Feb. 26, 2015, the contents of all of which are incorporated herein by reference in their entirety.

TECHNICAL FIELD

The present invention relates to data communication. In particular, although not exclusively, the present invention relates to providing network relay services using device-to-device communication.

Abbreviations

| | |
|---|---|
| 3GPP | 3$^{rd}$ Generation Partnership Project |
| D2D | Device-to-Device Communication or Direct |
| D2D-UE | Cellular User equipment with direct communication |
| DFN | D2D Frame Number |
| DRX | Discontinuous reception |
| DTX | Discontinuous transmission |
| eNB or eNodeB | Evolved NodeB |
| ePDCCH | enhanced Physical Downlink Control Channel |
| FDD | Frequency Division Duplex |
| HARQ | Hybrid Automatic Repeat Request |
| LTE | Long Term Evolution |
| MAC | Medium Access Control |
| MAC PDU | Medium Access Control Protocol Data Unit |
| OOC | Out of coverage |
| PDCCH | Physical Downlink Control Channel |
| PLMN | Public Land Mobile Network |
| PRB | Physical Resource Block |
| PS UE | Public Safety User Equipment |
| PTT | Push to Talk or Press to Transmit While one device transmits, the other(s) receive. |
| RB | Resource Block |
| RLC | Radio Link Control |
| RX | Receive |
| SA | Scheduling Assignment |
| SFN | System Frame Number |
| SIB | System Information Broadcast |
| TB | Transport Block |
| TDD | Time Division Duplex |
| T-RPT | Time Resource Pattern of Transmission |
| TX | Transmit |
| UE | User Equipment |

BACKGROUND ART

Recent advancements in the field of cellular communication include supporting direct or device-to-device (D2D) communication between two or more mobile devices operating in the licensed spectrum. Direct communication between mobile devices, with or without the coordination of the cellular communication network, provides a vast array of advantages over traditional cellular communication including improving local coverage, facilitating traffic offloading from cellular networks, providing service continuity for mobile devices that are moving away from a cellular network, supporting mission critical public safety communication and providing potential for various types of new services and applications.

Currently, the 3rd Generation Partnership Project (3GPP) is working towards standardising D2D communication in its existing long Term Evolution Advanced (LTE-A) cellular networks. It is envisioned that the upcoming Release-12 of the 3GPP standards will include D2D functionality to support public safety as well as non-public safety services. More specifically, support for D2D discovery in network coverage, D2D direct communication in and out-of network coverage and high layer support to enable group cast and unicast over the physical layer broadcast have already been standardized.

A work item for 3GPP Release 13 has been approved relating to more advanced features to support discovery in partial and outside network coverage, network coverage extension using UE-to-network relays, and discovery in the presence of multiple carriers and Public Land Mobile Networks (PLMNs). Of the objectives in the 3GPP Release-13 work item, UE-to-network relay is of particular interest in the public safety community as it may facilitate reliable public safety communication via service continuity and coverage extension. A UE-to-network relay feature is expected to be implemented in 3GPP Release-13 as Layer 3 packet forwarding based relaying supported by Release-12 D2D direct communication in the Physical layer.

3GPP Release-12 D2D direct communication is anticipated to include two operation modes, namely Mode-1 operation mode and Mode-2 operation mode. In Mode-1 operation mode, a base station (BS) schedules resources to be used by a UE to transmit direct control information followed by direct data. In particular, the BS uses a Physical Downlink Control Channel (PDCCH) or enhanced Physical Downlink Control Channel (ePDCCH) to allocate resources to a D2D transmitter for D2D control information or scheduling assignment (SA) transmission and D2D Data transmission, thus enabling contention and collision free multi-user access for Mode-1 communication. In contrast, in Mode-2 operation mode, a D2D-UE selects resources on its own from network configured or pre-configured D2D communication resource pools, for transmission of direct control information or SA and direct data. Mode-2 communication can be operated under network coverage or out-of-network coverage. However, in both scenarios, resource selection for SA and data transmission is performed by the UE on its own without a central coordination.

FIG. 1 illustrates a communication system 1 including UE-to-network relay operation. In particular, a device-to-device communication capable UE (D2D relay UE 11) that supports relay functionality, which is in the coverage of a cellular BS 12, may act as a Layer 3 (i.e. Internet Protocol) IP packet relay to another out-of coverage D2D-UE (i.e. OOC-UE 13). In this scenario, the communication between the D2D relay UE 11 and the OOC-UE 13 may take place in the physical layer using Mode-2 communication, while the communication between the D2D relay UE 11 and the BS 12 may follow cellular uplink (UL) and downlink (DL) communication procedures.

In one use case, the OOC-UE 13 is a public safety UE (PS UE) that wishes to communicate with another PS UE via a public safety network, and the OOC-UE 13 may utilise the D2D relay UE 11 for this purpose. In this scenario, the spectrum (f2) used by the OOC-UE 13 to communicate with other OOC-UEs is same as the spectrum (f1) used by the public safety network. In another use case, the D2D relay UE 11 may be a PS UE who is roaming on a commercial network; and this UE may act as a relay node to another PS UE (OOC-UE) who is outside the coverage of the commercial network. In this scenario, the spectrum (f2) used by the OOC-UE 13 to communicate with other OOC-UEs is different than the spectrum (f1) used by the commercial network.

Such D2D communication is anticipated to utilise the cellular UL resources, and operate in half-duplex manner. As a result of this single carrier operation, cellular UL transmission and D2D transmission (TX) or D2D reception (RX) cannot occur simultaneously. Therefore, from a UE perspective, cellular UL (TX) and D2D (TX/RX) operation needs to be time multiplexed. 3GPP has further chosen to prioritise cellular UL transmissions over D2D (TX/RX) communication in case of a resource collision or limited UE TX/RX capability, and not to introduce any discontinuous transmission (DTX) period for the purpose of aiding UE TX/RX switching.

Moreover, RX switching/re-tuning from one carrier to another (for instant from cellular DL to UL in FDD) may require at least one additional subframe for tuning purposes. As such, in subframes allocated for D2D, a D2D-UE with limited TX/RX capability may have to suspend D2D (TX/RX) communication in order to perform cellular communication. Since D2D transmission from the OOC-UE can be in any subframe within the Mode-2 resource pool that are also used by the relay UE in UL cellular communication (due to autonomous resource selection by the D2D-UE for Mode-2), the relay UE may miss reception of D2D data from the OOC-UE, resulting in packet loss or high latency. However, from a UE-to-network relay perspective, both cellular and D2D data is equally important to facilitate a reliable and low latency (for example VoIP) link between OOC-UE and the network.

Accordingly, there is a need for an improved method and system for data communication.

It will be clearly understood that, if a prior art publication is referred to herein, this reference does not constitute an admission that the publication forms part of the common general knowledge in the art in Australia or in any other country.

SUMMARY OF INVENTION

The present invention is directed to a system and method for data communication, which may at least partially overcome at least one of the abovementioned disadvantages or provide the consumer with a useful or commercial choice.

With the foregoing in view, the present invention in one form, resides broadly in a data communication method for use in a wireless communication system, the wireless communication system including a base station (BS), a relay user equipment (UE) and an out of coverage UE (OOC-UE), the method including:

receiving, at the relay UE and from the BS, a relay cycle configuration, the relay cycle configuration defining a relay cycle including a first time period for device to device (D2D) communication, and a second time period for cellular communication; and receiving, at the relay UE by D2D communication, within the first time period and from the OOC-UE, relay data; and providing, from the relay UE by cellular communication, within the second time period and to the BS, the relay data.

Advantageously, embodiments of the present invention enable coordination of cellular and D2D communication at the Relay-UE to achieve low latency, reliable UE-to-network relay functionality.

The relay cycle configuration may include a relay offset indicator, defining an offset of the relay cycle relative to a reference point.

The relay cycle configuration may include a relay cycle length, defining a length of the relay cycle, and a second time period length, defining a length of the second time period.

The method may further comprise providing, from the relay UE to the OOC-UE, an advertisement of network-relay services of the relay UE.

The step of providing the advertisement may comprise broadcasting, by the relay UE and to a plurality of OOC-UEs, the relay cycle configuration.

The relay UE may use a reserved or pre-determined Scheduling Assignment (SA) resource index to broadcast the relay cycle configuration.

The relay UE may use a pre-determined SA identifier to differentiate between Medium Access Control Protocol Data Units (MAC-PDUs) carrying the relay cycle configuration, and other MAC-PDUs including relayed MAC-PDUs.

The relay cycle configuration may be initially broadcast by the relay UE intensively, and subsequently broadcast periodically. A period of time that the relay UE performs intensive broadcasting of the relay cycle configuration may be configured by the BS.

The relay cycle configuration may include a relay cycle configuration window, defining when the relay UE may broadcast the relay cycle configuration in the relay cycle. The relay cycle configuration window may be defined by an integer number of repetitions of the relay cycle. A start of the relay cycle configuration window may be aligned with a start of the relay cycle.

The method may further comprise receiving, at the relay UE and from the BS, a relay cycle reconfiguration message, the relay cycle reconfiguration defining a new relay cycle, wherein subsequent relay data is transmitted between the relay UE and the OOC-UE, and between the relay UE and the BS according to the new relay cycle.

A plurality of relay cycles may be concatenated in a super-frame of 1024*10 ms. A first relay cycle of the plurality of relay cycles may be offset from a start of the super-frame by a relay offset indicator. The start of the super-frame may be defined by a first D2D Frame Number (DFN) or a first System Frame Number (SFN).

A last relay cycle of the plurality relay cycles may be truncated to fit into the super-frame.

The relay offset indicator may be equal to a scheduling assignment (SA) offset indicator. The relay offset indicator may be between 0 and 39 milliseconds.

The relay cycle may be configured to span over a single SA period, wherein the second time period is at least partially overlapping with a D2D data pool associated with the SA Period.

The relay cycle may be configured to span over several SA periods, wherein the second time period is at least partially overlapping with a D2D data pool associated with an SA period of the several SA periods. The several SA periods comprise an integer number of SA periods.

The relay cycle may be configured to span over a first integer number of SA periods, and the second time period is configured to span over a second integer number of SA periods, wherein the second integer number may be as large as the first integer number. In particular, the second integer number may be less than or equal to the first integer number.

In another form, the invention resides broadly in a data communication method for use in a wireless communication system, the wireless communication system including a base station (BS), a relay user equipment (UE) and an out of coverage UE (OOC-UE), the method including:

receiving, at the relay UE and from the BS, a relay cycle configuration, the relay cycle configuration defining a relay cycle including a first time period for device to device (D2D) communication, and a second time period for cellular communication; and receiving, at the relay UE by cellular communication, within the second time period and from the BS, relay data; and providing, by the relay UE by D2D communication, within the first time period and to the OOC-UE, the relay data.

In yet another form, the present invention resides broadly in a wireless communication system including:

a base station (BS);

an out of coverage UE (OOC-UE); and a relay user equipment (UE), the relay UE configured to:

receive, from the BS, a relay cycle configuration, the relay cycle configuration defining a relay cycle including a first time period for device to device (D2D) communication, and a second time period for cellular communication;

receiving, by D2D communication, within the first time period and from the OOC-UE, relay data; and provide, by cellular communication, within the second time period and to the BS, the relay data.

According to certain embodiments of the present invention, the relay cycle (relay_cycle) is configurable and periodically or repeatedly used in the BS, the relay UE and the OOC-UEs to realise D2D relay communication between the BS and OOC-UEs via the relay UE. A configurable relay cycle comprises a first time period ("cellular silence period") and a second time period ("cellular active period") that are multiplexed in time forming the relay cycle, wherein the first time period in the said relay cycle may be designated for D2D communication among the relay UE and OOC-UE(s), and the second time period in the said relay cycle may be designated for cellular uplink (UL) and downlink (DL) communication between the BS and relay UE in exchanging control data, user data and/or application data. The method further allows for configuration and reconfiguration of the first time period and second time period lengths forming the overall relay cycle length, such that their ratio may be further determined to adapt to the number of connected OOC-UEs, the number of connected OOC-UEs requiring network relay services, routing traffic volume and/or meet desired quality-of-service.

The relay cycle may be configured so that one relay cycle may fully overlap with the regionally configured or pre-configured SA Period (that is standardised in 3GPP Release 12) where the second time period length is further configured to span partially over the D2D data pool leaving sufficient number of T-RPTs for use in restricted D2D communication as part of the first time period length. The relay cycle may also be configured so that one relay cycle may fully overlap with an integer number of regionally configured or pre-configured SA Periods, where the second time period length is further configured to span partially over the D2D data pool of an SA Period. This may leave a sufficient number of T-RPTs for use in D2D communication or span over an integer number of the SA Periods.

The method may further comprise the BS configuring the relay UE with a relay cycle configuration or reconfiguration information elements (IEs) including but not being limited to relay cycle period, a second time period for deriving first time period being used in conjunction with a D2D communication pool. The relay UE may then at the implicitly signalled activation time forward the relay cycle configuration or reconfiguration IEs to OOC-UEs within its transmission range by means of intensive or rapid broadcasting (e.g. on every relay cycle) the relay cycle configuration information for a defined period of time to advertise its network-relay services and associated configuration IEs to the existing OOC-UEs in the proximity. Later, periodic broadcasting (e.g. on every configurable integer number of relay cycles) of the relay cycle configuration information and relay cycle configuration IEs may be used for the duration of a configuration, to maintain the current configured or reconfigured relay cycle configuration and allow late arrival of OOC-UE(s). In broadcasting relay cycle configuration IEs on a D2D communication pool, the relay-UE may use a reserved or pre-determined scheduling assignment (SA) resource index, to allow OOC-UEs to search for SA guiding to the reception of relay cycle configuration, and/or a pre-determined SA-ID (i.e. SA Identifier) in a transmitted SA to allow OOC-UEs to differentiate the associated MAC-PDUs carrying relay cycle configuration IEs with other MAC-PDUs including relayed MAC-PDUs.

According to certain embodiments of the present invention, multiple configurable relay cycles are time-multiplexed without gap, forming a timing structure having a time period of 1024*10 ms. The start of a first relay cycle may align with the start of a first SA period, and a last relay cycle may be truncated to fit into a window of 1024*10 ms. An activation time of the initial relay cycle configuration may be the start of the newly configured relay cycle that is immediately after the completion of a relay cycle configuration at the relay UE. The activation time of a relay cycle reconfiguration may be start of the newly configured relay cycle that is immediately after the end of the currently configured relay cycle during which the completion of relay cycle reconfiguration has occurred at the Relay-UE. The period of time that the relay UE performs intensive/rapid broadcasting of a relay cycle configuration/reconfiguration may be implicitly signalled by the BS and defined as the time from the activation time to the time where the first periodic broadcast of a relay cycle configuration or reconfiguration occurs. The BS may further configure the relay UE with a "relay cycle configuration window", where the start of the first "relay cycle config window" may align with the start of the first relay cycle in the unique time-frame of 1024*10 ms, and the relay UE uses the relay cycle configuration window ("relay_cycle_config_window") in periodically broadcasting (i.e. on every configurable integer number of relay cycles) relay cycle configuration IEs for the duration of a configuration.

Embodiments of the present invention provide methods to support D2D relay communication between BS or network access node and out of coverage D2D-UEs via a network relay capable D2D-UE (the relay UE) by structurally coordinating/configuring cellular communication and D2D communication operations and periodicity at the relay UE such that low latency or predicted latency, and/or reliable relay functionality is achieved. Furthermore, mandatory TX/RX requirements are eliminated, and as such the present invention may be used for single TX/RX UEs. Further again, power consumption due to frequent RX retuning from one frequency to the other is eliminated.

The network relay functionality may be built on top of 3GPP Rel-12 D2D framework, where Rel-12 D2D broadcast communication is used as baseline communication by the relay UE to communicate with the other D2D-UEs that are requesting the relay services.

Certain embodiments of the present invention include a SuperFrame, in which the D2D relay cycle is repeated contiguously without a gap, where SuperFrame starts from D2D Frame Number (DFN) zero and ends when the DFN is reset to a zero.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

BRIEF DESCRIPTION OF DRAWINGS

Various embodiments of the invention will be described with reference to the following drawings, in which:

FIG. 8 illustrates a timing diagram of an exemplary relay reconfiguration, according to an embodiment of the present invention:

FIG. 9 illustrates a timing diagram of a further exemplary relay reconfiguration activation time, according to an embodiment of the present invention;

DESCRIPTION OF EMBODIMENTS

Various embodiments of the present invention relate to device-to-device (D2D) communication. D2D communication is also commonly referred to as or peer to peer (P2P) communication or direct mode communication, and relates to direct communication between communications devices.

As described in further detail below, various embodiments of the present invention provide a UE-to-network relay, enabling network connectivity to out-of-coverage UE(s). The network relay may be provided in licenced spectrum that is allocated for public safety communication and cellular communication, such as long term evolution (LTE) communication specified by the 3rd Generation Partnership Project (3GPP).

Figure 1:
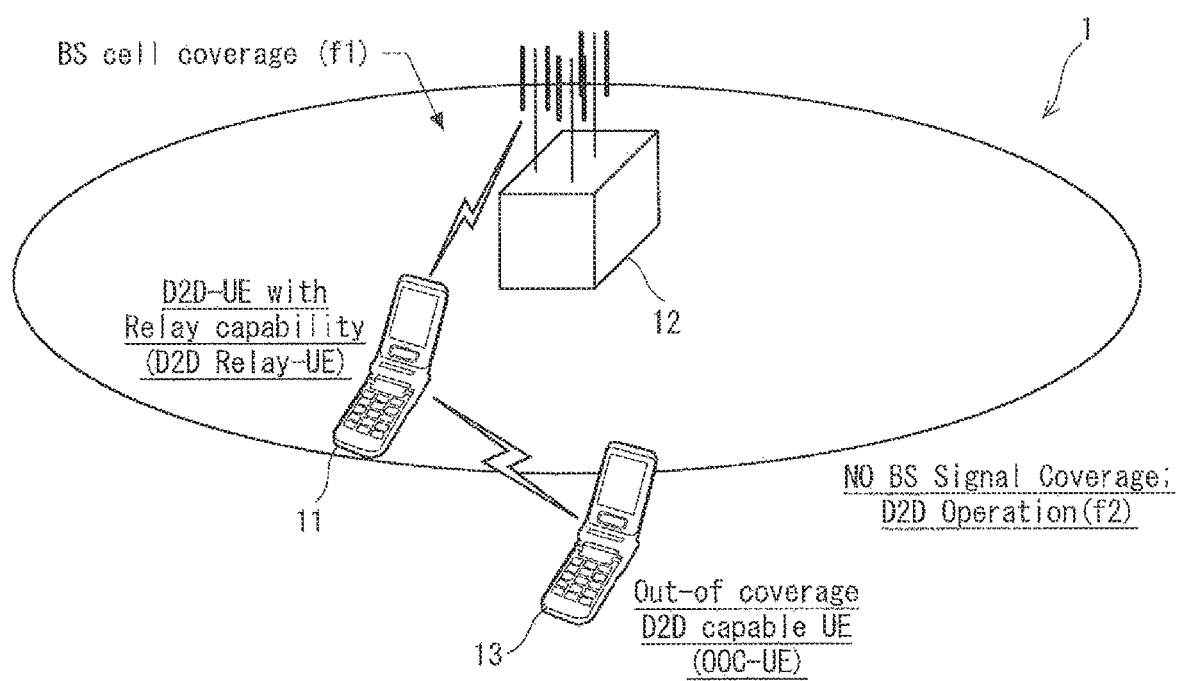
FIG. 1 illustrates a communication system including UE-to-network relay operation.
Figure 2:
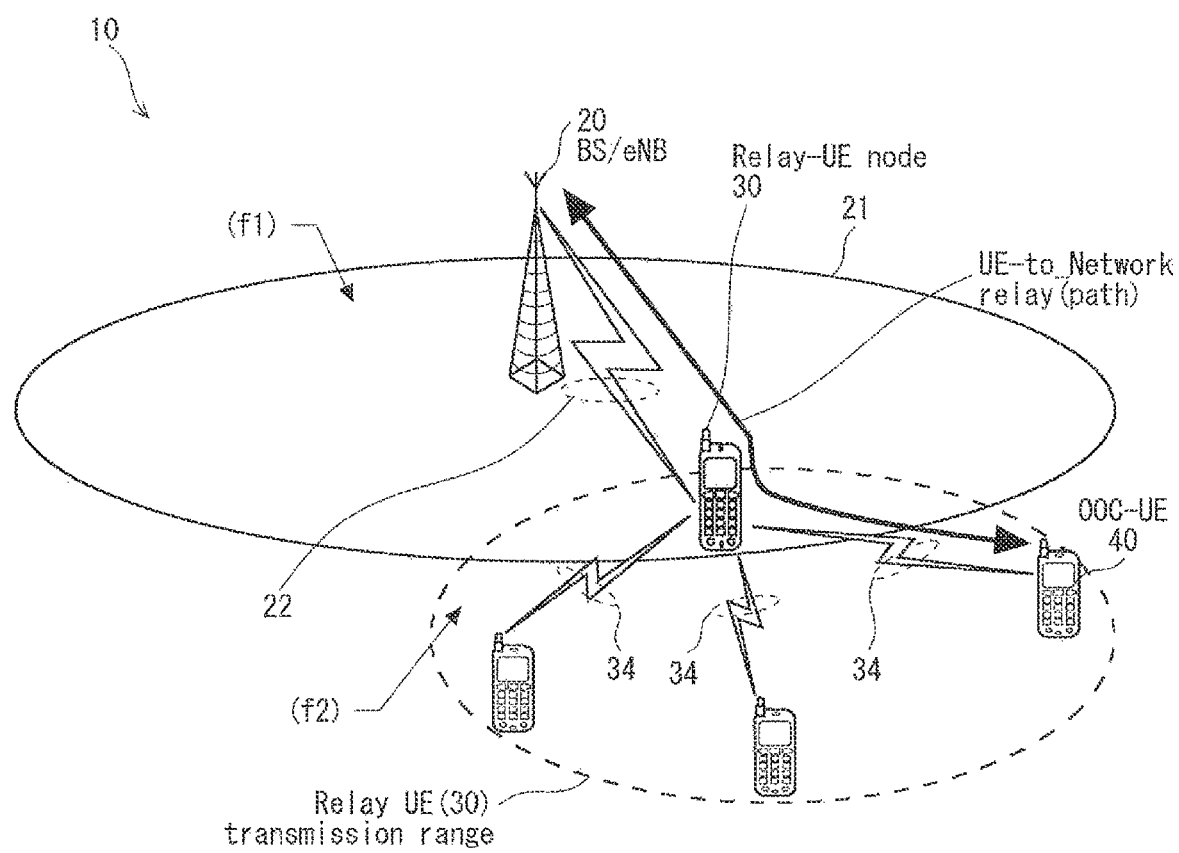
FIG. 2 illustrates an advanced wireless communication system, according to an embodiment of the present invention.

FIG. 2 illustrates an advanced wireless communication system 10, according to an embodiment of the present invention. The advanced wireless communication system 10 comprises a cellular network access node in the form of a base station (BS) 20 that provides wireless cellular coverage 21 to a D2D relay user equipment (UE) 30 on a paired or unpaired carrier frequency f1. The wireless communication system 10 further comprises one or more out-of-coverage UEs (OOC-UEs) 40, which are out-of-coverage of the BS 20, but are within transmission range of the D2D relay UE 30.

The D2D relay UE 30 is configured as a relay UE node that is capable of relaying control data, protocol data, user data, and application data between OOC-UEs 40 and the BS 20 using D2D links 34 on carrier frequency f2, and a cellular link 22 on an uplink (UL) component of carrier frequency f1, in a coordinated manner. The frequency f2 can be a public-safety frequency and f2 may be the same as the UL component of f1.

The D2D relay UE 30 is configured by the BS 20 to operate as a relay UE node when it is in RRC-connected mode. The D2D relay UE 30 may also be requested by one or more OOC-UEs 40 in a D2D group to operate as a relay UE node, providing UE-to-network relay service to the OOC-UEs 40 in its direct transmission range. When being requested by an OOC-UE 40 to operate as a relay UE node, the D2D relay UE 30 may first establish an RRC connection with its servicing BS 20 and further request a relay configuration from the BS 20.

As discussed in further detail below, a relay cycle ("Relay_cycle") structure for cellular and D2D communication is then configured by the BS 20, for use by the BS 20, the D2D relay UE 30, and OOC-UEs 40. In particular, the relay cycle structure is employed at the D2D relay UE 30 to multiplex a D2D communication link 34 and cellular communication link 22 in the time domain, to enabling timely delivery of delay sensitive data and/or error intolerant data between the BS 20 and OOC-UEs 40.

Figure 3:
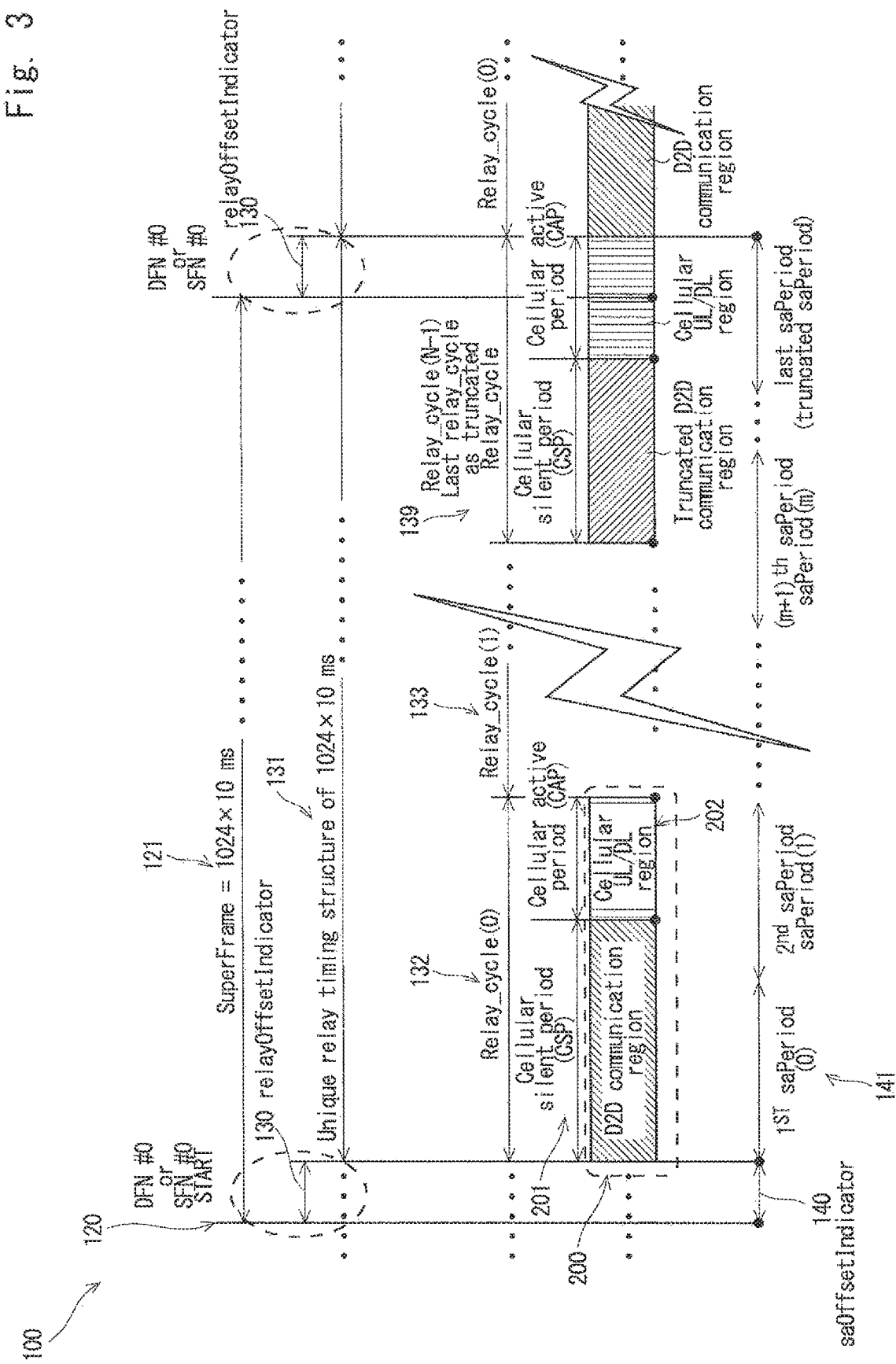
FIG. 3 illustrates a data structure of the system of FIG. 2, according to an embodiment of the present invention.

FIG. 3 illustrates a data structure 100 of the system 10, according to an embodiment of the present invention. The data structure 100 includes a relay cycle 200 comprising first and second configurable communications regions or periods that are time-multiplexed. In particular, the relay cycle 200 includes a "cellular silence period (CSP)" 201, which is reserved for D2D communication between the D2D relay UE 30 and the OOC-UEs 40, and a "cellular active period (CAP)" 202, which is reserved for cellular communication between the BS 20 and the Relay-UE 30. Multiple relay cycles 132, 133, 139 are concatenated without gap to form the data structure 100, having a standard time frame 131 that is 1024*10 milliseconds long.

The start of the first relay cycle 132 is offset by a relay offset indicator (relayOffsetIndicator) 130 from the start 120 of a frame (SuperFrame) 121, i.e. offset from D2D frame number (DFN) 0 or System Frame Number (SFN) 0. The relayOffsetIndicator 130 is configured such that the start of the first relay cycle 132 and the first saPeriod 141 are aligned. As a result, the relayOffsetIndicator 130 is equal to the standardised saOffsetIndicator 140, the configured value of which is selected from the range of 10, 1, 2, . . . , 38, 391 milliseconds.

Each configured relay cycle 132, 133, 139 of a configuration in the standard time frame 131 has a configurable length selected from the range of [40, 80, 160, 320, 640] milliseconds. The last relay cycle 139 may be truncated to fit in the length of the standard time frame 131, i.e. 1024*10 milliseconds.

Furthermore, the CAP 202 within a configured relay cycle 132, 133, 139 is configurable to have a duration in the range of [20: 200] milliseconds with a granularity of 1 ms. The CSP 201 of the relay cycle 132, 133, 139 can then be derived from the configured relay cycle and CAP durations.

Once configured, the data structure 100 is repeated until a relay cycle reconfiguration is received, termination of the relay cycle configuration is triggered by the BS 20, or the D2D relay UE 30 has departed from the region and no longer available to provide the UE-to-Network relay service.

Relay cycle configuration elements or reconfiguration information elements (IEs), including the relay cycle length and CAP length, may be appropriately determined by the servicing BS 20 provided that saPeriod configuration for the corresponding D2D communication link is known to the BS 20.

Figure 4:
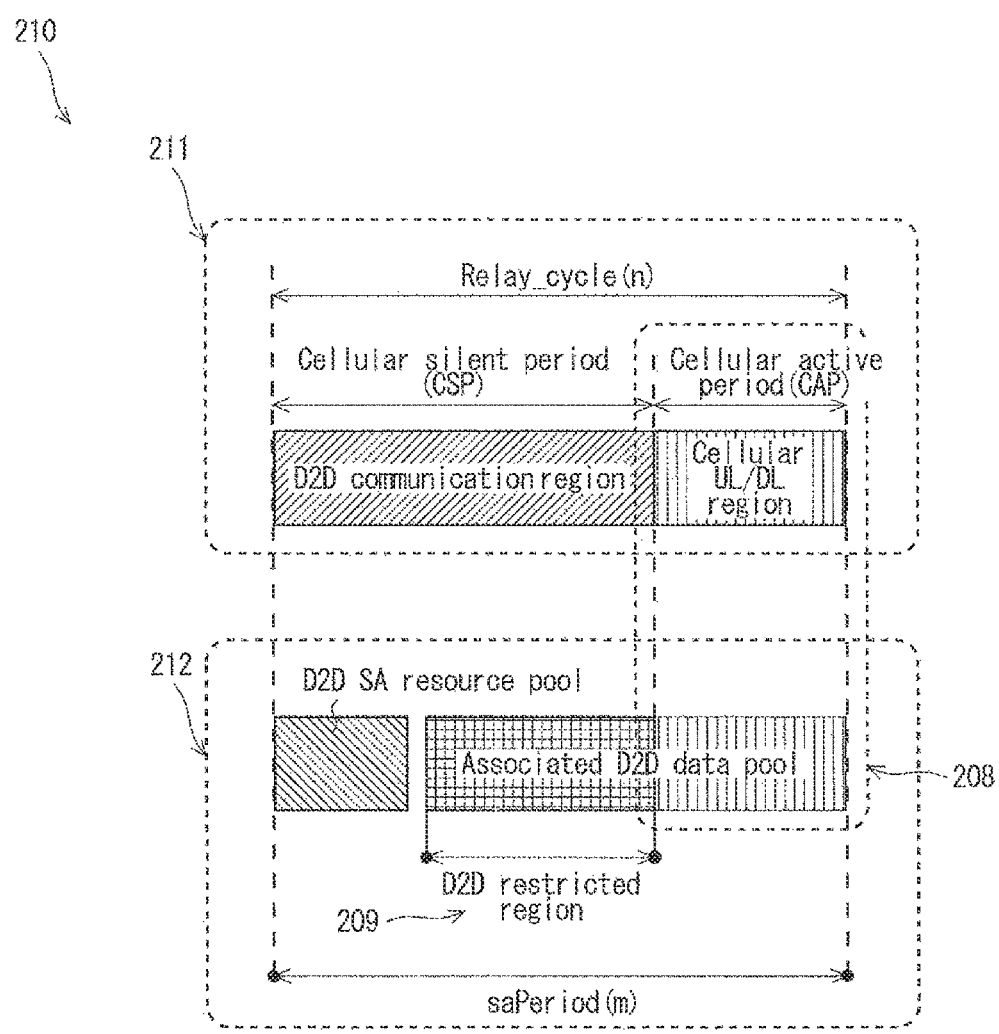
FIG. 4 illustrates a relay cycle to saPeriod mapping of the system of FIG. 2, according to an embodiment of the present invention.

FIG. 4 illustrates a relay cycle to saPeriod mapping 210 of the system 10, according to an embodiment of the present invention. As discussed above, the mapping 210 is configured by the BS 20 to enable time multiplexing of communication from the D2D relay UE 30 to the BS 20, and from the D2D relay UE 30 to the OOC-UE(s) 40.

The relay cycle to SA period mapping 210 has been configured such that a relay cycle 211 can be mapped entirely to an SA period (saPeriod) 212. A CAP length 208 of the relay cycle 211 has also been configured such that a sufficient number of Time-Resource pattern of transmissions (T-RPTs) are available for MAC-PDU transmission and reception are available within a D2D restricted region 209.

Figure 5:
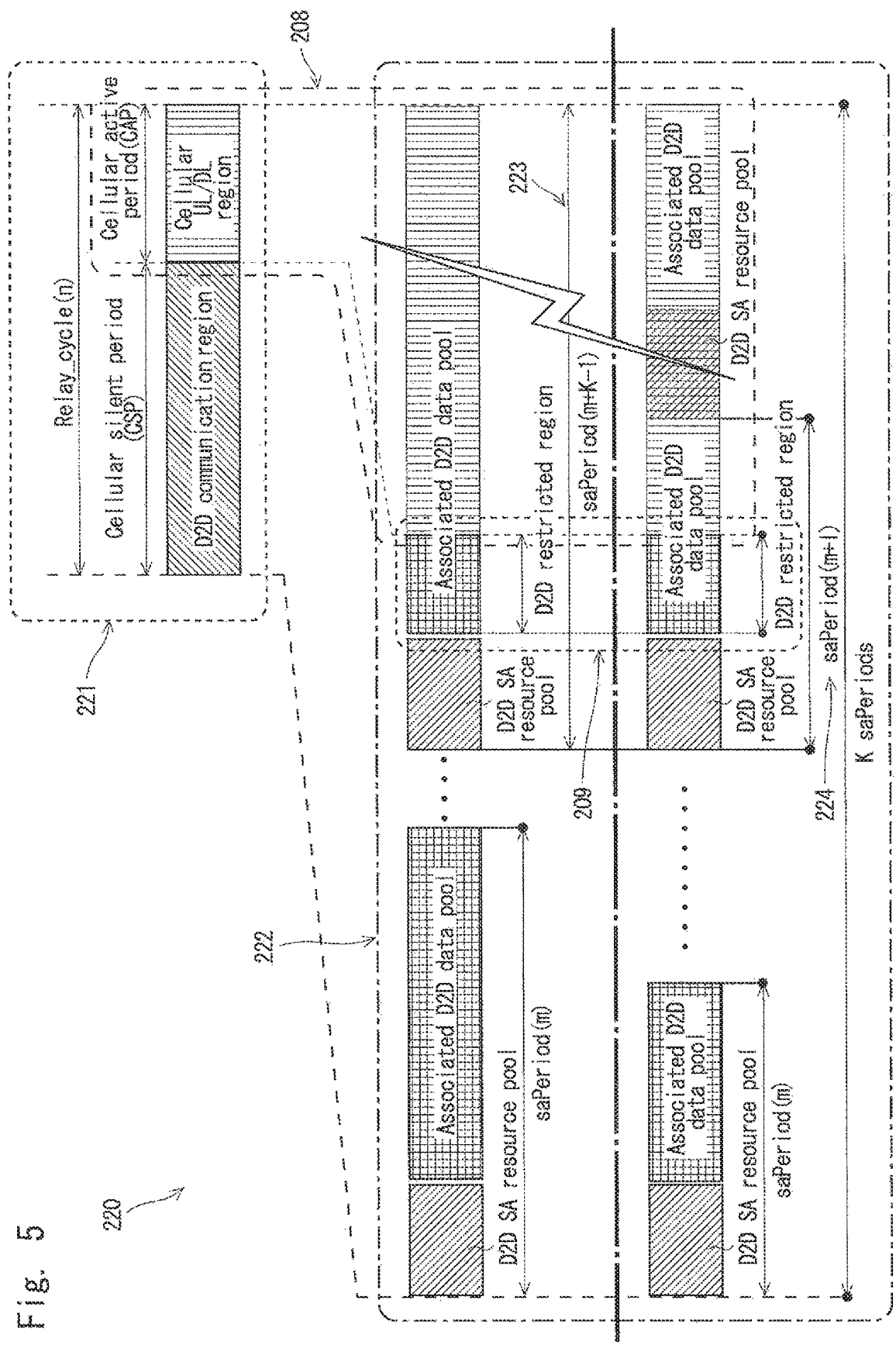
FIG. 5 illustrates a relay cycle to saPeriod mapping of the system of FIG. 2, according to a further embodiment of the present invention.

FIG. 5 illustrates a relay cycle to SA period mapping 220 of the system 10, according to a further embodiment of the present invention.

The relay cycle to SA period mapping 220 has been configured such that a relay cycle 221 can be mapped to an integer number (K) SA periods 222. Furthermore, a CAP length 208 is configured to partially overlap with a D2D data pool of an SA period 223, or 224 such that a sufficient number of T-RPT(s) are available for MAC-PDUs transmission and reception within the D2D restricted region 209.

Figure 6:
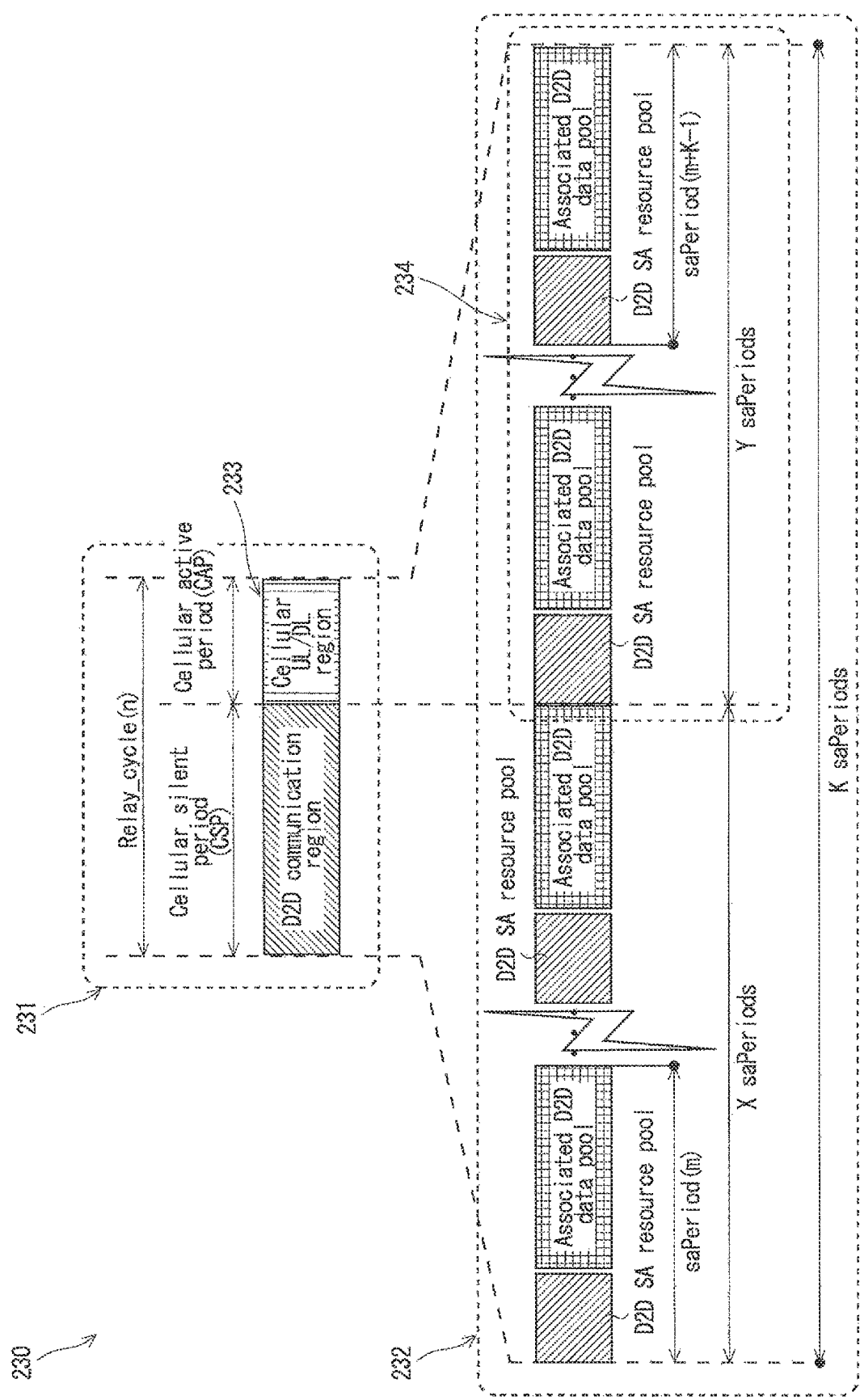
FIG. 6 illustrates a relay cycle to saPeriod mapping of the system of FIG. 2, according to yet a further embodiment of the present invention.

FIG. 6 illustrates a relay cycle to SA period mapping 230 of the system 10, according to yet a further embodiment of the present invention.

The relay cycle to SA period mapping 230 has been configured such that a relay cycle 231 can be mapped entirely into an integer number (K) SA periods 232. Furthermore, a CAP length 233 is configured to span over an integer number Y SA periods 234.

Further embodiments of the present invention relate to a "Relay cycle configuration activation time" and "Relay cycle reconfiguration activation time", as discussed below.

Figure 7:
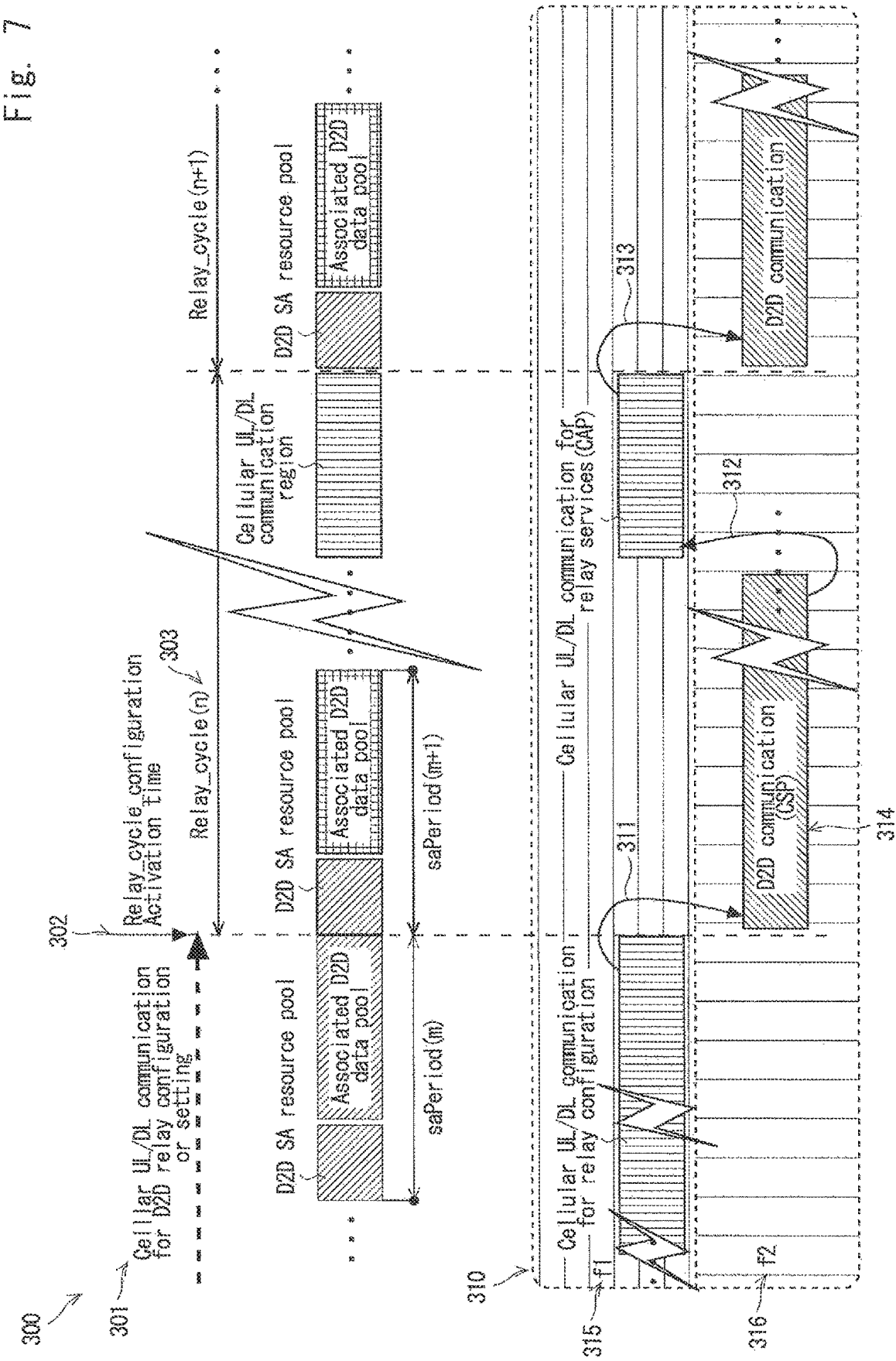
FIG. 7 illustrates a timing diagram of the system of FIG. 2, according to an embodiment of the present invention.

FIG. 7 illustrates a timing diagram 300 of the system 10, according to an embodiment of the present invention.

A D2D relay configuration 301 is initially provided to a relay UE by a base station, as discussed above. The D2D relay configuration 301 defines an activation time 302 of a relay cycle that immediately succeeds it, namely a start of relay cycle n (Relay_cycle(n)) 303.

At the relay cycle configuration activation time 302, the relay UE performs switching 311 from cellular (TX/RX) communication operation on an UL component of carrier frequency f1 315 to direct (TX/RX) communication operation on carrier frequency f2 316.

In relay cycle n 303, the relay UE performs switching 312 from direct communication (TX/RX) on carrier frequency f2 316 to cellular communication (TX/RX) on UL component of carrier frequency f1 315 when a CSP 314 of relay cycle n 303 ends. Furthermore, at the end of a relay cycle (and thus at the start of another relay cycle), the relay UE will again perform switching 313 from cellular communication (TX/RX) on the UL component of carrier frequency f1 315 to direct communication (TX/RX) on the carrier frequency f2 316.

Once being configured and activated, a relay cycle configuration is valid until a relay cycle reconfiguration or a new relay cycle configuration is configured by the servicing BS and becomes activated, or the current configuration is terminated by the servicing BS. A relay cycle reconfiguration or new relay cycle configuration can occur anywhere in a relay cycle in a super-frame (1024*10 ms).

FIG. 8 illustrates a timing diagram 350 of an exemplary relay reconfiguration, according to an embodiment of the present invention. In particular, a relay UE initially operates at a first relay cycle configuration 351, and then is configured to switch to a second relay cycle configuration 352.

A relay cycle reconfiguration is provided, which is completed 354 during a relay cycle 353 of the first relay cycle configuration 351. The relay cycle reconfiguration is activated at a start 355 of a relay cycle of the second relay cycle configuration 352 which is immediately after an end 357 of the relay cycle 353. In particular, the second relay cycle configuration 352 has an activation time 355 corresponding to the start of the first relay cycle of the second relay cycle configuration 352 that is after the end 357 of the relay cycle 353.

An overlapping relay cycle 356 overlaps with the activation time 355. The first relay cycle configuration 351 is used for all relay cycles before the overlapping relay cycle 356, including any intermediate relay cycles, as discussed below with reference to FIG. 9.

FIG. 9 illustrates a timing diagram 360 of a further exemplary relay reconfiguration activation time, according to an embodiment of the present invention. The timing diagram 360 is similar to the timing diagram 350 of FIG. 8. In particular, a relay UE initially operates at a first relay cycle configuration 361, and then is configured to switch to a second relay cycle configuration 362.

A relay cycle reconfiguration is provided, which is completed 364 during a relay cycle 363 of the first relay cycle configuration 361. The relay cycle reconfiguration is activated at a start 365 of a relay cycle of the second relay cycle configuration 352 which is immediately after an end 367 of the relay cycle 363.

However, an intermediate relay cycle occurs between the end 367 of the relay cycle and the activation time 355. As a result, an overlapping relay cycle 366, which overlaps with the activation time 355, is after the intermediate relay cycle. The first relay cycle configuration 351 is used for all relay cycles before the overlapping relay cycle 356, including the intermediate relay cycle.

A further aspect of the present invention relates to a method for being used by a relay UE in advertising, and maintaining UE-to-network relay service to existing OOC-UE(s), and allowing new arrival OOC-UE(s) to utilise existing UE-to-network relay service when a relay UE node has been configured, established and operating.

Figure 10A:
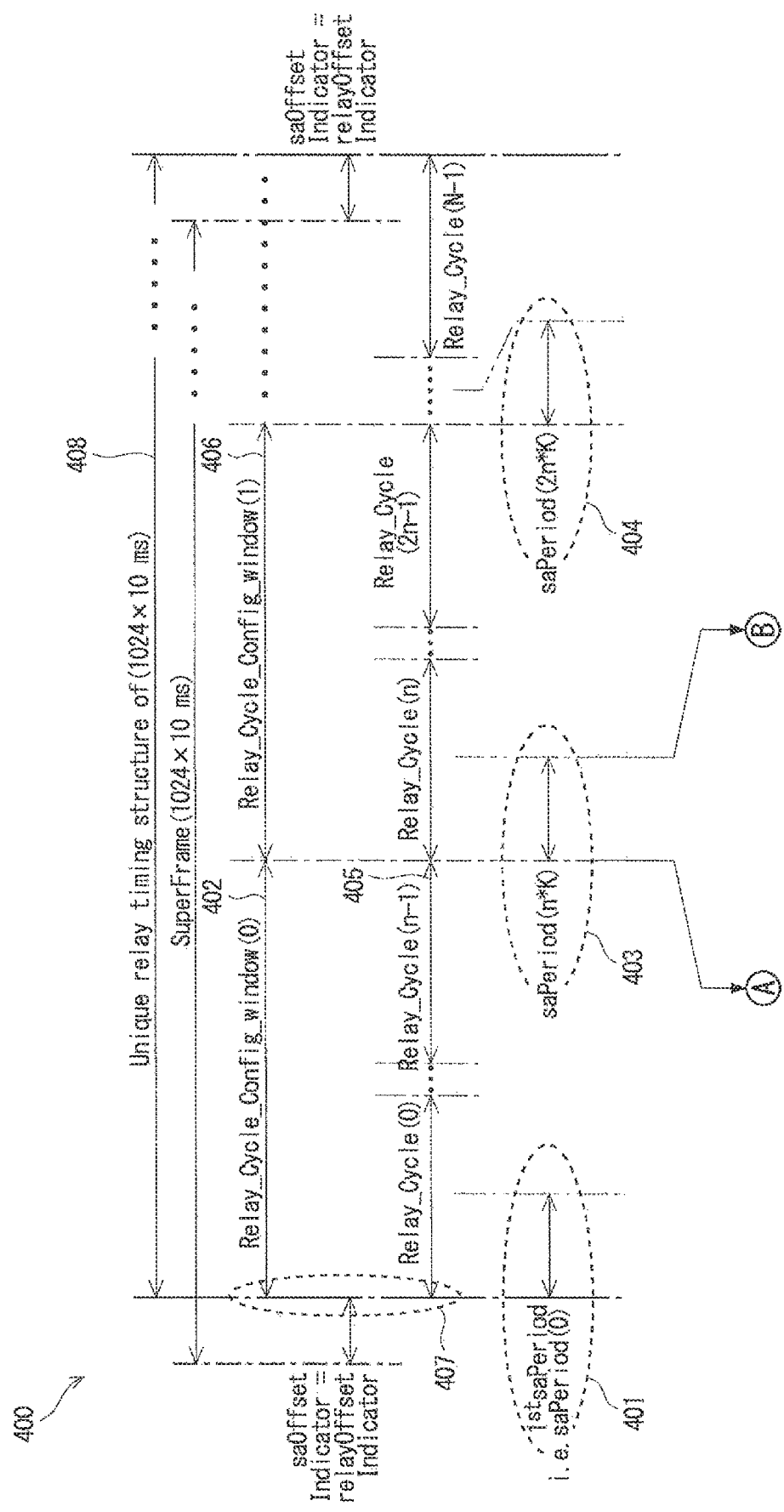
FIG. 10A illustrates relay configuration diagram, according to an embodiment of the present invention.
Figure 10B:
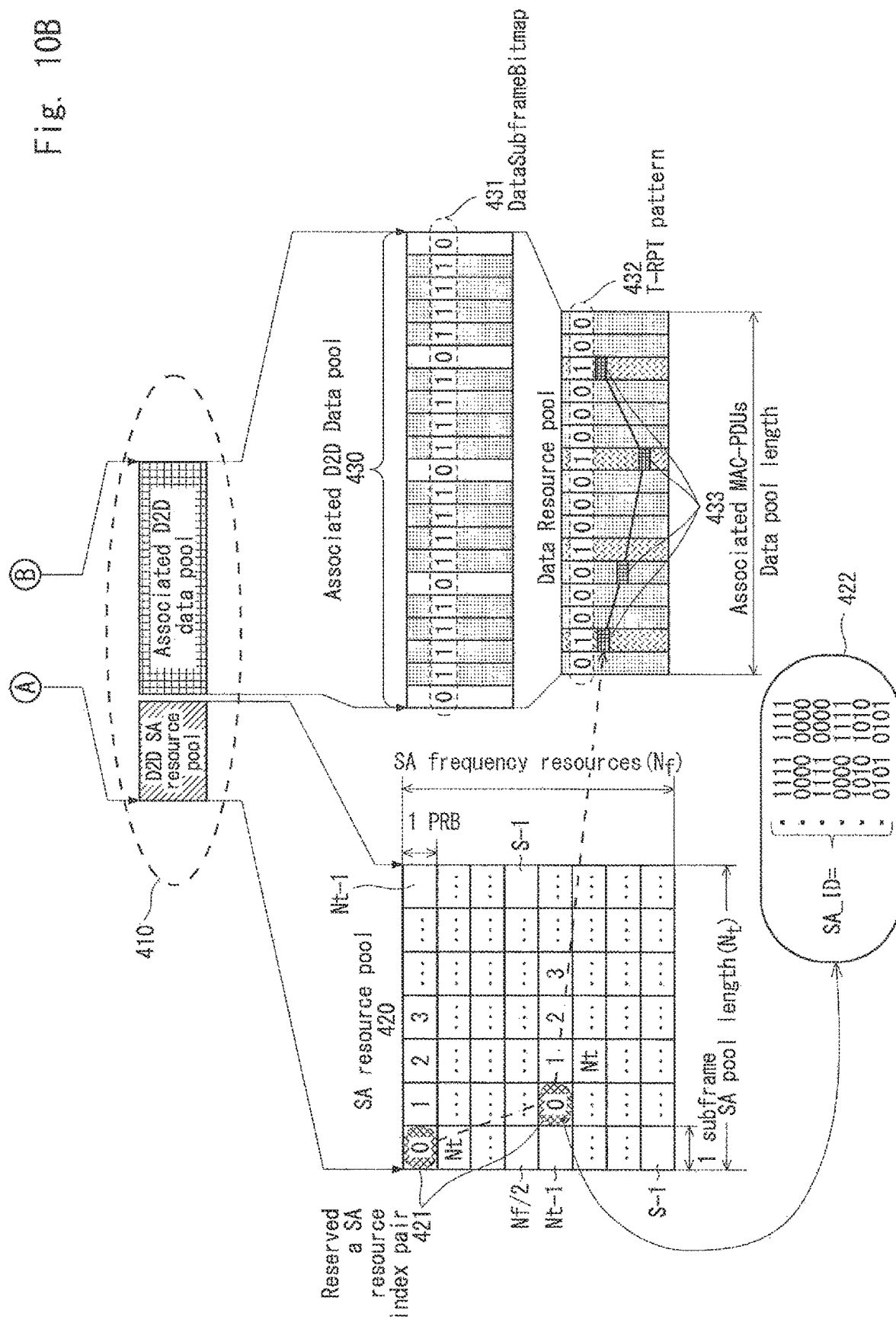
FIG. 10B illustrates relay configuration diagram, according to an embodiment of the present invention.

FIG. 10A and FIG. 10B illustrates relay configuration diagram 400, according to an embodiment of the present invention.

Once a relay UE has been configured and is in service, the relay UE periodically, on a carrier frequency allocated/pre-configured for direct communication in a selected SA period 410, broadcasts an SA 421 and associated MAC-PDUs 433 carrying a relay cycle configuration. The relay cycle configuration comprises a relay cycle length, a configured CAP length and a configured relay cycle configuration window (Relay_cycle_config_window) 402, 406.

The relay cycle configuration window 402, 406 comprises an integer number of repetitions of the relay cycle length and the start of a first relay cycle configuration window 402 within a timing window of 1024*10 ms aligns with the start of a first relay cycle 407. The last relay cycle configuration window may be truncated to fit into a super-frame or timing window of 1024*10 ms.

The relay cycles 405 and the relay cycle configuration window 402, 406 define a structure 408 that is repeated in every timing window of 1024*10 ms.

According to certain embodiments of the present invention, the relay UE selects an SA period 401, 403, 404 in a configured relay cycle configuration window 402, 406, for broadcasting the SA 421 in an SA resource pool 420 and associated MAC-PDUs 433 in the data pool 430. The relay UE preferably selects the first SA period 401, 403 of the relay cycle configuration window 402, 406. The selected SA period 401, 403, 404 is used to carry relay cycle configuration IEs. When broadcasting the SA 421, the relay UE may select special SA resource index preferably SA resource index 0 421.

In a transmitted SA, the relay UE may further use a special SA-ID 422 that may be selected from (but not limited to) the set of {1111 1111; 0000 0000; 1111 0000; 0000 1111; 1010 1010; 0101 0101}, to enable the OOC-UE to determine if the associated MAC-PDUs 433 carry relay cycle configuration IEs.

Figure 11:
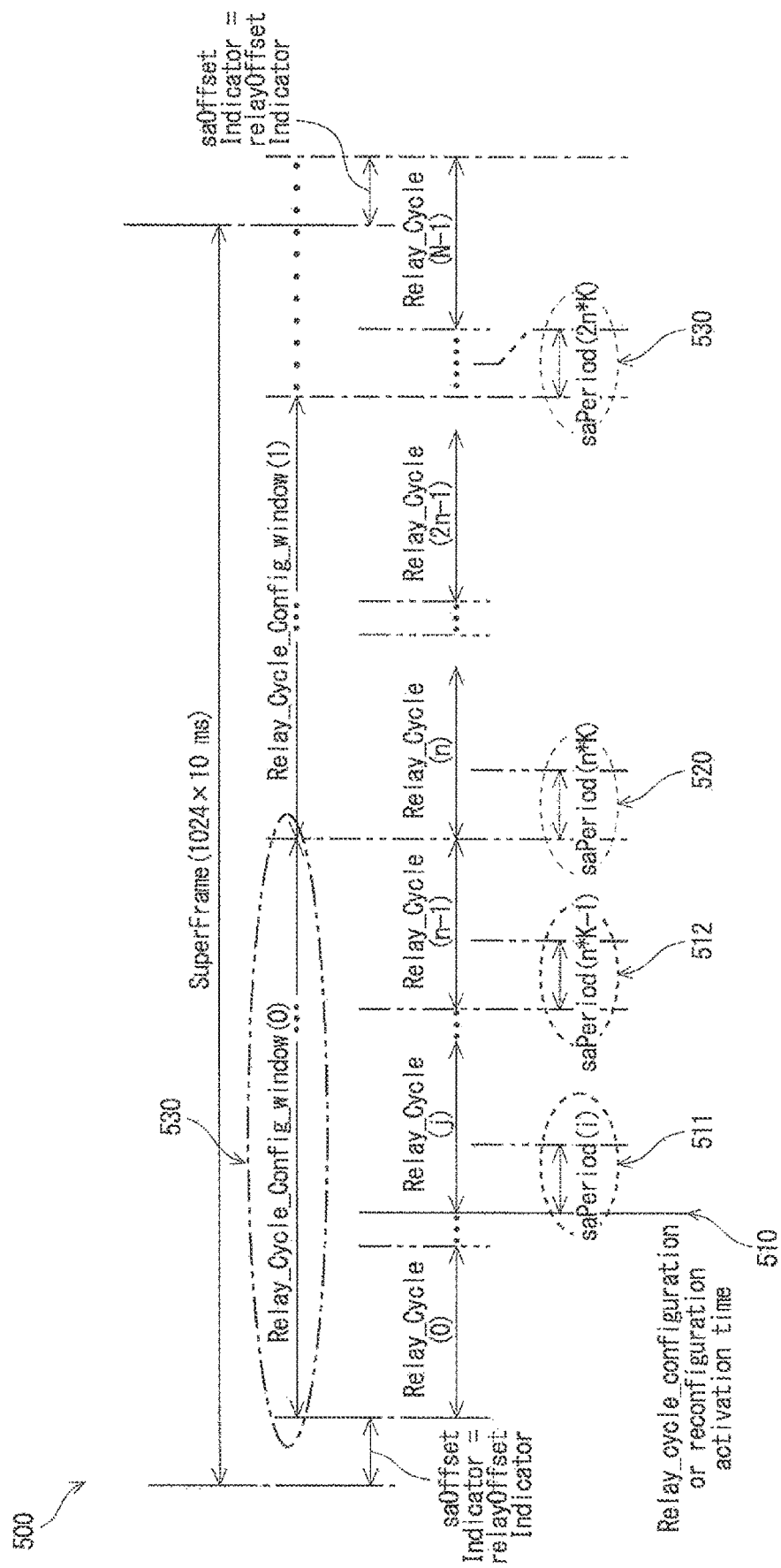
FIG. 11 illustrates relay configuration diagram, according to an embodiment of the present invention. Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way.

FIG. 11 illustrates relay configuration diagram 500, according to an embodiment of the present invention.

In order to enable an OOC-UE to acquire broadcasted relay cycle configuration or reconfiguration information with desirable confidence, the servicing BS may configure the relay UE to broadcast relay cycle configuration to OOC-UE(s) in addition to the periodically scheduled broadcast of relay cycle configuration as described above with reference to FIG. 8 and FIG. 9. In particular, the BS may configure the relay UE to broadcast relay cycle configuration on every relay cycle 511, 512 that is immediately after a relay cycle configuration or reconfiguration activation time 510, and within a relay cycle configuration window 530.

As a result an OOC-UE may be able to utilise network relay functionality of the relay UE, even if the periodically scheduled broadcast of relay cycle configuration is missed.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

This application is based upon and claims the benefit of priority from Australian provisional patent application No. 2015900674, filed on Feb. 26, 2015, the disclosure of which is incorporated herein in its entirety by reference.

REFERENCE SIGNS LIST 10 advanced wireless communication system
20 base station
30 D2D relay UE
40 out-of-coverage UE (OOC-UE)

The invention claimed is:

1. A method for a relay user equipment in a wireless communication system, the wireless communication system including a base station, the relay user equipment and an out of coverage UE, the method comprising:
   establishing a RRC connection with the base station;
   transmitting first information to the base station, the first information indicating a request to transmit second information and third information to the relay user equipment; and
   receiving the second information and the third information, in response to the first information, from the base station after the establishment of RRC connection, the second information indicating a first time period, the first time period defining a sum of a second time period reserved for device to device communication and a third time period reserved for cellular communication, and the third information indicating a relay offset indicator defining an offset from a start of a system frame number #0 to a start of the first time period, wherein the second information is repeated.

2. A relay user equipment in a wireless communication system, the wireless communication system including a base station, the relay user equipment and an out of coverage UE, the relay user equipment comprising:
   a transmitter configured to transmit first information to the base station, the first information indicating a request to transmit second information and third information to the relay user equipment; and
   a receiver configured to receive the second information and the third information, in response to the first information, from the base station after an establishment of RRC connection with the base station, the second information indicating a first time period, the first time period defining a sum of a second time period reserved for device to device communication and a third time period reserved for cellular communication, and the third information indicating a relay offset indicator defining an offset from a start of a system frame number #0 to a start of the first time period, wherein the second information is repeated.

* * * * *

UNITED STATES PATENT AND TRADEMARK OFFICE
CERTIFICATE OF CORRECTION

PATENT NO. : 10,667,311 B2
APPLICATION NO. : 16/388289
DATED : May 26, 2020
INVENTOR(S) : Phong Nguyen and Kevin Lin It is certified that error appears in the above-identified patent and that said Letters Patent is hereby corrected as shown below:

In the Specification

Column 8, Description of Embodiments, Line 60; Delete "10, 1, 2, . . . , 38, 391" and insert --[0, 1, 2, ..., 38, 39]-- therefor Signed and Sealed this
Seventeenth Day of November, 2020

Andrei Iancu
*Director of the United States Patent and Trademark Office*